US005465247A

United States Patent [19]
Kobayashi

[11] Patent Number: 5,465,247
[45] Date of Patent: Nov. 7, 1995

[54] OPTICAL HEAD

[75] Inventor: Shohei Kobayashi, Hachioji, Japan

[73] Assignee: Olympus Optical Co., Ltd., Tokyo, Japan

[21] Appl. No.: 61,034

[22] Filed: May 14, 1993

[30] Foreign Application Priority Data

May 14, 1992 [JP] Japan .................. 4-122059

[51] Int. Cl.⁶ ..................................... H01J 3/14
[52] U.S. Cl. ................ 369/109; 369/44.23; 369/112
[58] Field of Search .............. 369/44.14, 44.21, 369/44.22, 44.23, 100, 103, 112, 109, 110; 359/15, 483, 485, 487; 250/201.5

[56] References Cited

U.S. PATENT DOCUMENTS 5,029,255 7/1991 Opheij et al. ............. 250/201.5
5,060,217 10/1991 Kume ........................ 369/120
5,198,916 3/1993 Kim .......................... 359/15

FOREIGN PATENT DOCUMENTS 323413 1/1991 Japan.
4109435 4/1992 Japan.

Primary Examiner—Davis L. Willis
Assistant Examiner—Don Wong
Attorney, Agent, or Firm—Stevens, Davis, Miller & Mosher

[57] ABSTRACT

An optical head for recording and reproducing information on and from an opto-magnetic record medium by projecting a light beam onto the record medium and introducing a return light beam reflected by the record medium onto photodetectors, including a light source for emitting a linearly polarized light beam, an objective lens for projection the light beam onto the record medium, and an optical element having a surface on which a beam splitting surface is provided in the diverging or converging return beam. Said beam splitting surface is curved such that light rays of the return light beam are made incident upon the beam splitting surface at substantially the same incident angle, so that the return light beam can be split accurately into P-polarized and S-polarized light beams.

1 Claim, 9 Drawing Sheets

FIG_1
PRIOR ART
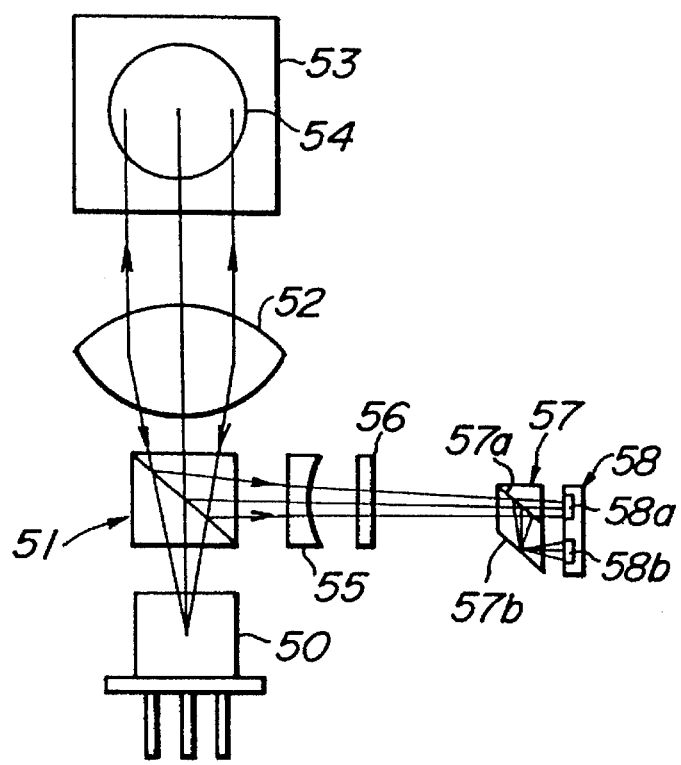
FIG_2
PRIOR ART
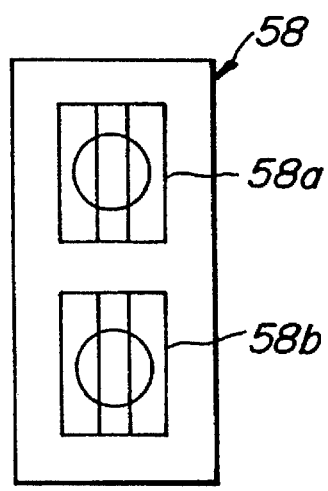

FIG_3
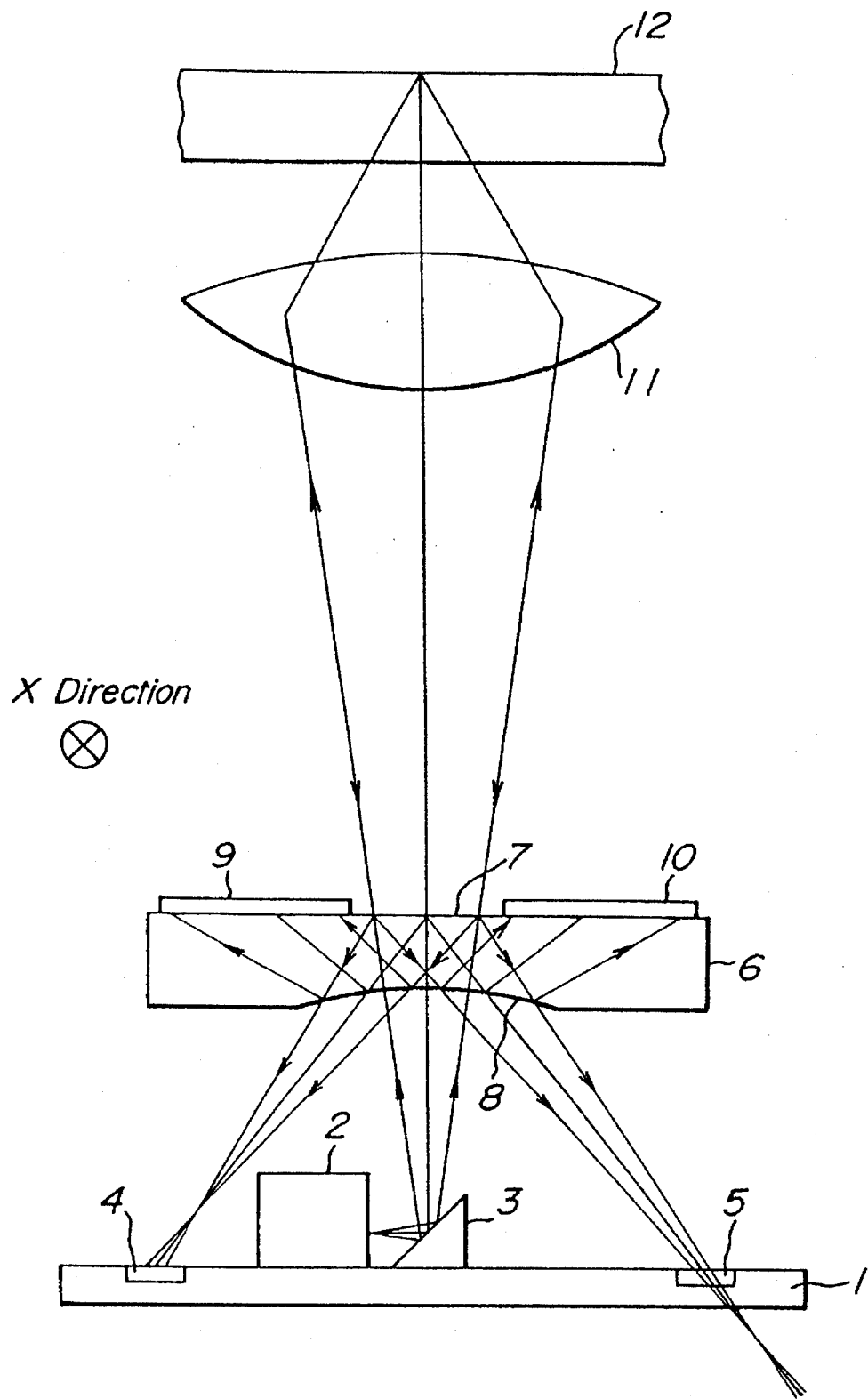

FIG_4
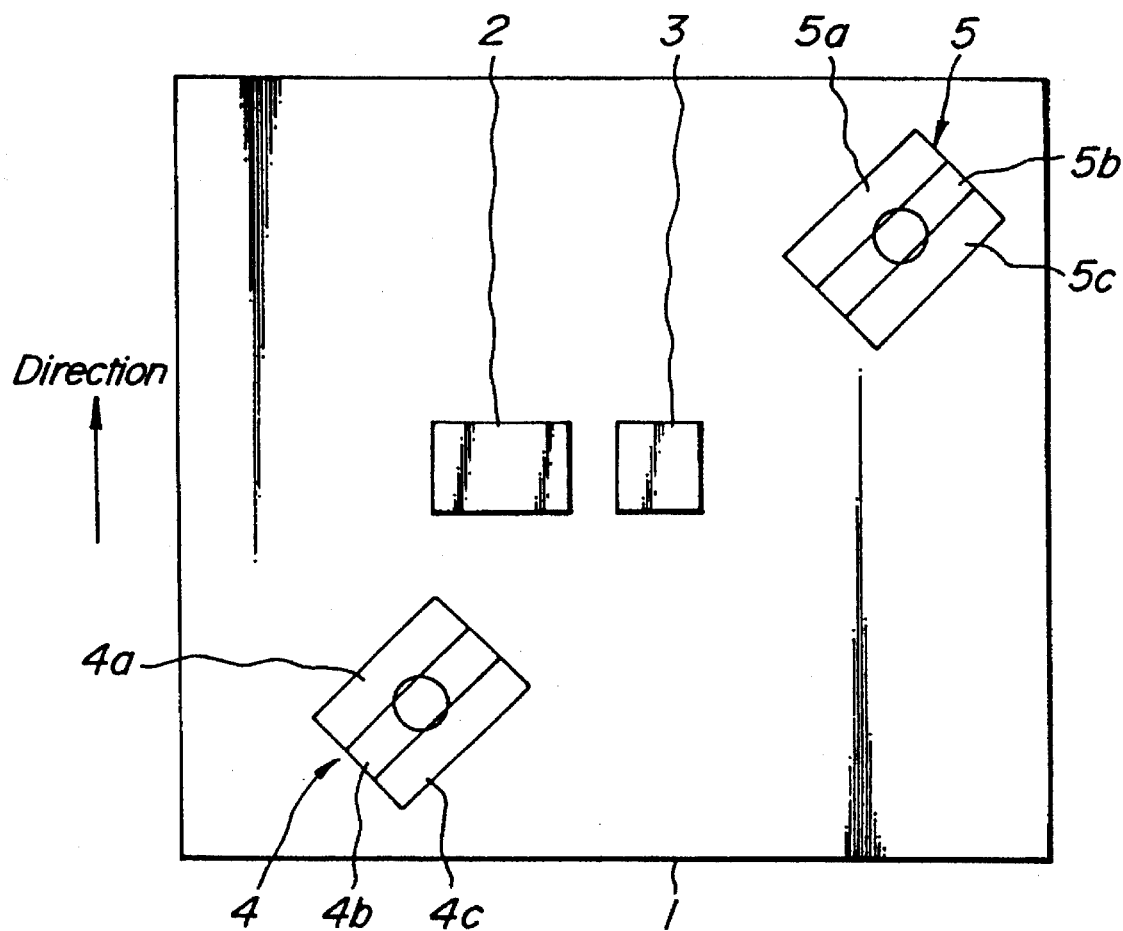

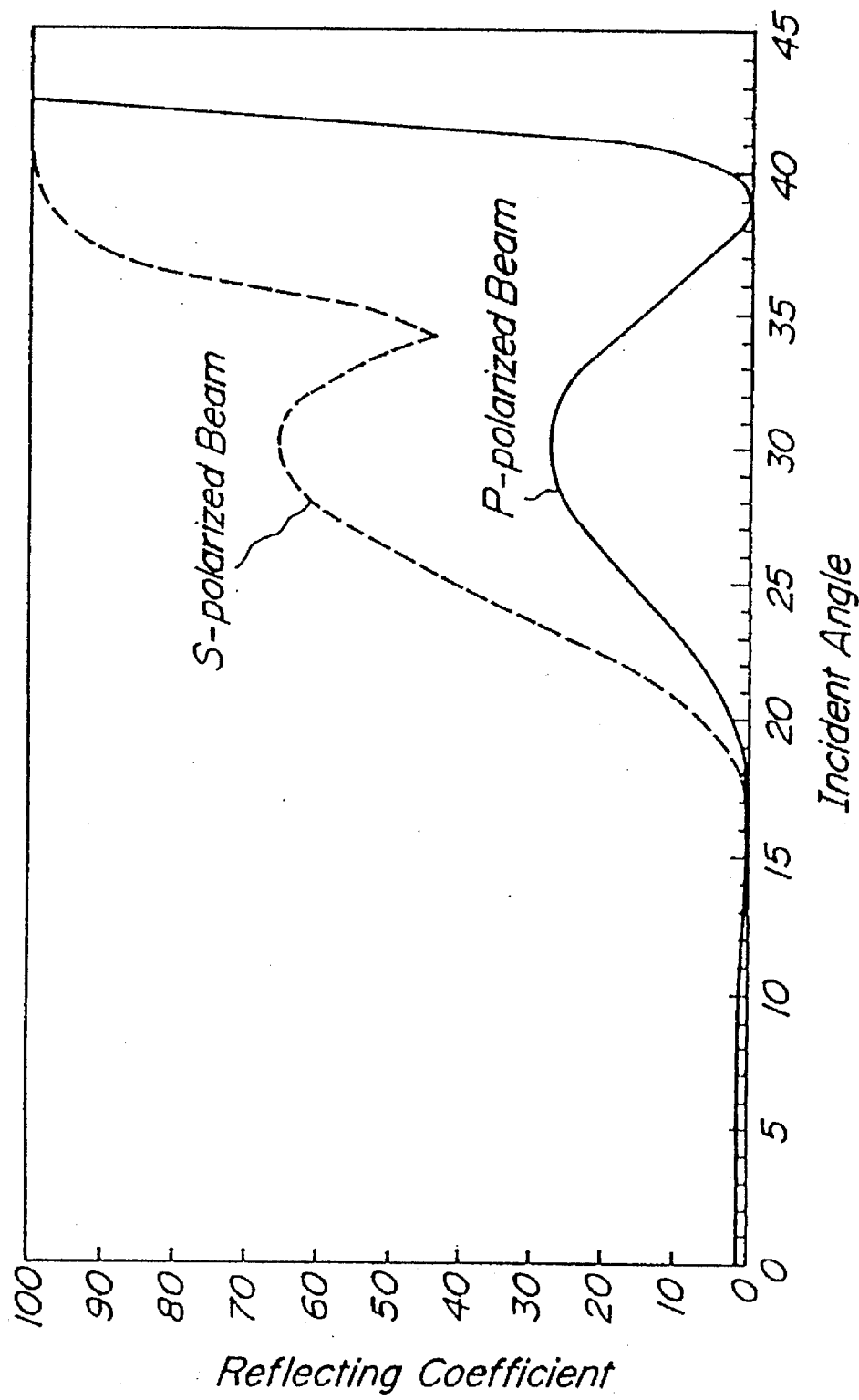
FIG._5

FIG_10

OPTICAL HEAD

BACKGROUND OF THE INVENTION

1. Field of the Invention

The present invention relates to an optical head for recording and reproducing information on and from an optical record medium such as an opto-magnetic record medium.

2. Description of the Related Art

FIGS. 1 and 2 show a general construction of a known optical head for use in an apparatus for recording and reproducing information on and from an opto-magnetic record medium, in which a linearly polarized light beam emitted from a semiconductor laser 50 is made incident on a beam splitter 51 as a P-polarization light beam, and a part of this light beam is transmitted through the beam splitter 51 and is converted into a parallel light beam by a collimator lens 52. The parallel light beam emanating from the collimator lens 52 is made incident upon a reflection mirror 53 which is inclined by 45 degrees with respect to a plane of the drawing of FIG. 1, so that the light beam is deflected by 90 degrees and is made incident upon an objective lens 54. Then, the parallel light beam is focused by the objective lens 54 onto a recording surface of an opto-magnetic record medium (not shown) as a fine spot.

In the opto-magnetic record medium information is recorded as a magnetizing direction, and when the linearly polarized light beam is reflected by the record medium, the polarizing direction is rotated in opposite directions depending on the magnetizing direction by the well known Kerr effect. The reflected light (return light) reflected by the opto-magnetic record medium again travels back along the optical axis onto the beam splitter 51 through the object lens 54, reflection mirror 53 and collimator lens 52.

The return light beam impinging upon the beam splitter 51 includes an S-polarization component, because the polarization plane of this light beam-has been rotated by the Kerr effect. A substantial part of the S-polarization components is reflected by the beam splitter 51, and a small part of a P-polarization component is reflected by the beam splitter 51.

The return light reflected by the beam splitter 51 is transmitted through a concave lens 55 and is then transmitted through a half wavelength plate 56, so that the polarizing direction of this light beam is rotated by 45 degrees. Then, the light beam emanating from the half wavelength plate 56 is made incident upon a polarization beam splitter 57. The thus introduced beam is split into the P-polarization component and the S-polarization component by a flat beam splitting surface 57a in the polarization beam splitter 57. The P-polarization component transmitted through the beam splitting surface 57a is made incident upon a first light receiving element 58a of a photodetector 58, and the S-polarized component reflected by the beam splitting surface 57a and further reflected by a reflection surface 57b of the polarizing beam splitter 57 is made incident upon a second light receiving element 58b of the photodetector 58. By suitably processing output signals generated from the first and second light receiving elements 58a and 58b, it is possible to derive an information signal, a focusing error signal and a tracking error signal.

FIG. 2 is a plan view of the photodetector 58 having the light receiving elements 58a and 58b, each of which is divided into three strip-shaped light receiving regions. The principle of detecting the above mentioned signals is well known in the art, so that its explanation is omitted here.

In the conventional optical head, the polarization beam splitter 57 for splitting the return light reflected by the opto-magnetic record medium is arranged in a converging light beam. Therefore, incident angles of light rays impinging upon the flat beam splitting surface 57a are not constant, but are different from each other. Therefore, it is impossible to accurately split the incident light beam into the P- and S-polarized components. This causes a drawback in that the above mentioned signals obtained from an output of the photodetector 58 might be deteriorated.

SUMMARY OF THE INVENTION

The present invention has for its object to provide a novel and useful optical head, in which the return light beam reflected from the opto-magnetic record medium can be split accurately into P- and S-polarized components by means of a polarizing beam splitter which is arranged in the converging light beam, and thus the deterioration of the signals can be reduced.

According to the invention, an optical head for recording and reproducing information by irradiating a light spot on an optical record medium comprises:

a light source for emitting a linearly polarized light beam;

an optical lens system including an objective lens for projecting said light beam onto the optical record medium as a fine spot and for collecting light reflected by the optical record medium to form a return light beam;

a beam splitting means having a beam splitting surface arranged in a (converging or diverging) light beam for splitting said return light beam into a plurality of light beams, said beam splitting surface being curved such that light rays in the return light beam are made incident upon said beam splitting surface substantially at the same incident angle; and a photoelectric converting means having a plurality of photodetectors for receiving said plurality of light beams split by said beam splitting surface.

According to the invention, said beam splitting means comprises the curved beam splitting surface, so that although the beam splitting surface is arranged in the diverging or converging light beam, the light beam can be made incident upon the curved beam splitting surface substantially at the same incident angle. Therefore, the incident beam can be split accurately, and thus not only the information signal, but also the focusing and tracking error signals can be obtained precisely.

In Japanese Patent Application Laid-open Publication Kokai Hei 3-23413, there is disclosed a known optical head, in which a diffraction grating serving as the beam splitting means is arranged on a curved surface of an spherical objective lens. Further, in Japanese Patent Application Laid-open Publication Kokai Hei 4-109435, there is also described a known optical head, in which a beam splitting surface formed by a half mirror is curved in order to introduce the astigmatism into the light beam. However, in these known optical heads, it is not mentioned at all that the beam splitting surface is covered such that almost all light rays in an incident light beam are made incident upon the beam splitting surface at substantially a same incident angle, although the beam splitting surfaces are arranged within the converging light beams.

Brief Description of the Drawings FIG. 1 is a schematic plan view showing the construction of the known optical head;

FIG. 2 is a plan view illustrating the photodetector shown in FIG. 1;

FIG. 3 is a sectional view depicting a first embodiment of the optical head according to the invention;

FIG. 4 is a plan view showing the silicon substrate of the first embodiment;

FIG. 5 is a graph representing the reflection characteristic of the polarizing beam splitter;

DETAILED DESCRIPTION OF THE PREFERRED EMBODIMENTS

Figure 6:
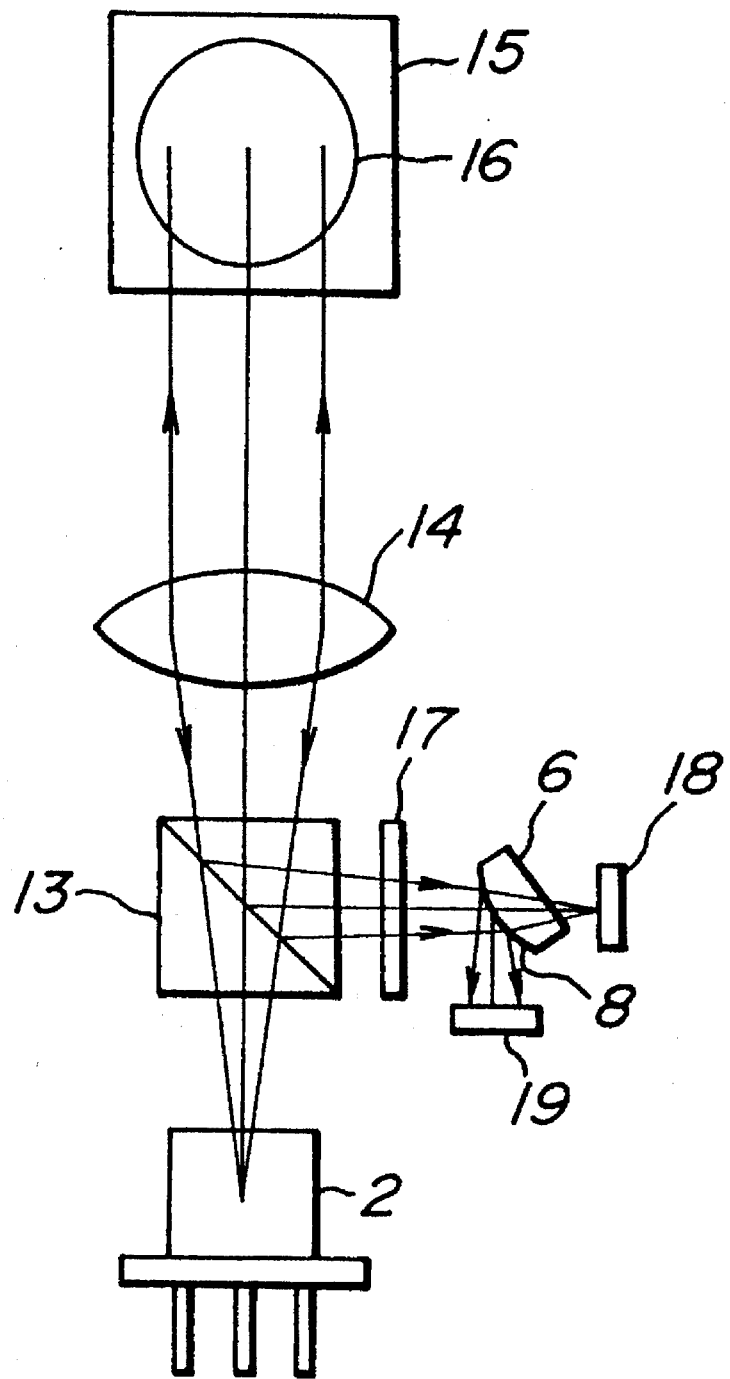
FIG. 6 is a sectional view illustrating the construction of a second embodiment of the optical head according to the invention.

FIG. 3 is a schematic sectional view showing a first embodiment of the optical head according to the invention and FIG. 4 is a plan view of a silicon substrate provided in the optical head shown in FIG. 3. On a silicon substrate 1 there are mounted a semiconductor laser 2 and a reflection mirror 3 such that a laser light beam emitted by the semiconductor laser 2 is made incident upon the mirror 3. The light beam emitted from the semiconductor laser 2 is linearly polarized. It is assumed that the polarizing direction, i.e. a direction of the plane of polarization is assumed to be an X direction which is perpendicular to a plane of a drawing of FIG. 3. Further, it is assumed that information is recorded on the opto-magnetic record medium in the form of a track extending in parallel with or perpendicular to the X direction.

An optical element 6 is disposed for receiving the light beam reflected by the reflection mirror 3. A hologram 7 is formed in a surface of the optical element 6 opposite to the semiconductor laser 2. The hologram 7 includes a function of diffraction gratings parallelly extending in a direction which is inclined with respect to the X direction by 45 degrees (in FIG. 4, an angle measured from the X direction in the anti-clockwise direction is assumed to be a positive angle). Furthermore, the hologram 7 exhibits a lens performance for providing positive and negative powers to +1 and −1 order diffracted light beams, respectively as will be explained later.

In a surface of the optical element 6 facing the semiconductor laser 2, there is formed a curved beam splitting surface 8. A multi-layered film made of dielectric materials is coated on the beam splitting surface 8 such that a transmissivity of the beam splitting surface 8 is approximately 100% for light rays which are made incident upon the surface substantially at incident angle of zero degree. Reflecting coefficients of the beam splitting surface 8 for the P-polarized light and S-polarized light are approximately 0% and 100%, respectively when these light beams are made incident upon said surface at an incident angle of approximately 39 degrees. This designates that the beam splitting surface 8 functions as a polarizing beam splitter for the light beam having an incident angle of approximately 39 degrees.

FIG. 5 is a graph representing the reflection property of the beam splitting surface 8 for the P-polarized and S-polarized light beams, while the incident angle with respect to the beam splitting surface 8 is varied from zero degree to 45 degrees.

As shown in FIG. 4, photodetectors 4 and 5 are disposed on the silicon substrate 1 such that they are aligned on a line which is inclined with respect to the X direction by −45 degrees and are arranged symmetrically with respect to the reflection mirror 3. The photodetector 4 is divided in a direction parallel with said line into three strip-shaped light receiving regions 4a, 4b, and 4c. The photodetector 5 is similarly divided into three strip-shaped light receiving regions 5a, 5b, and 5c. These light receiving regions are also extending in the direction which is inclined by −45 degrees with respect to the X direction.

As illustrated in FIG. 3, on the surface of the optical element 6 where the hologram 7 is formed, there are arranged photodetectors 9 and 10 on respective sides of the hologram 7. Further, an objective lens 11 is arranged in an optical path of the zero order light beam emanating from the optical element 6. The objective lens 11 converges this light beam and projects a fine light spot on a record surface of an opto-magnetic record medium 12.

In operation, the linearly polarized light beam emitted from the semiconductor laser 2 (this polarizating direction is in parallel with the X direction) is made incident on the reflection mirror 3 and is reflected thereby in a direction substantially perpendicular to the plane of the silicon substrate 1. The reflected light beam is then made incident upon the curved beam splitting surface 8 of the optical element 6 at an incident angle of approximately zero degree, so that almost all the incident beam is transmitted through the beam splitting surface 8. The transmitted light beam is further made incident upon the hologram 7. The zero order light beam emanating from the hologram 7 is directed to the objective lens 11 and is converged thereby. The thus converged light beam is made incident upon the opto-magnetic record medium 12 as a very small light spot.

As stated above, the light beam emitted from the semiconductor laser 2 is linearly polarized in the X direction. When the light beam is reflected by the opto-magnetic record medium 12, the polarizing direction is rotated in opposite directions due to the Kerr effect in accordance with the magnetizing direction in the record layer of the opto-magnetic record medium 12. The light beam reflected by the opto-magnetic record medium 12 (return light beam) is again made incident upon the optical element 6 through the objective lens 11. This return light beam is diffracted by the hologram 7 into zero order and higher order diffraction beams. In the present embodiment, among these diffraction beams, +1 and −1 order diffracted light beams are used.

As stated above, the gratings of the hologram 7 are inclined by 45 degrees with respect to the X direction, and thus the +1 and −1 order diffraction light beams emanate in directions which are inclined with respect to the X direction by −45 degrees. These +1 and −1 order diffraction light beams emanating from the hologram 7 are made incident upon the polarization beam splitting surface 8. In the present invention, said beam splitting surface 8 is curved such that all light rays in the +1 and −1 order light beams are made incident upon the curved surface substantially at the same incident angle equal to 39 degrees. Therefore, almost all the P-polarized component of the incident light beams is transmitted through the curved polarizing beam splitting surface 8 and is detected by the photodetectors 4 and 5 and almost all the S-polarized component is reflected by the surface 8 and is made incident upon the photodetectors 9 and 10 through the optical element 6.

Due to the refracting function of the hologram 7, the +1 order diffracted light beam received by the photodetector 4 is focused at a point before the photodetector 4, but the −1 order diffracted light beam impinging upon the the photodetector 5 is focused at a point behind the photodetector 5. The positive and negative refracting powers of the hologram 7 are set such that when the objective lens 11 is positioned at an in-focus point in which the light beam is just focused on the record layer of the opto-magnetic record medium 12, light spots on the photodetectors 4 and 5 have the same size. Therefore, when the objective lens 11 is in a de-focus position which is closer to or far from the opto-magnetic record medium 12, the light spots on the photodetectors 4 and 5 vary in opposite senses. That is to say, when the size of the spot on the photodetector 4 becomes larger or smaller, the size of the spot on the photodetector 5 becomes smaller and larger, respectively.

Therefore, a focusing error signal FE can be obtained by the known beam size method by calculating the following equation:

$$FE=(Ia-Ib+Ic)-(Ja-Jb+Jc)$$

where Ia, Ib, Ic and Ja, Jb, Jc represent output signals of light receiving regions 4a, 4b, 4c and 5a, 5b, 5c of the respective photodetectors 4 and 5 shown in FIG. 4.

A tracking error signal TE can be derived from the following equation by the also known push-pull method:

$$TE=(Ia-Ic)-(Ja-Jc)$$

A rotation of the polarizing direction of the return light beam with respect to the X direction due to the Kerr effect causes a variation in a ratio of an amount of the P-polarization component to an amount of the S-polarization component which are separated by the polarizing beam splitter surface 8, and thus an information signal S can be derived from the following equation:

$$S=(Ia+Ib+Ic+Ja+Jb+Jc)-(Ka+Kb)$$

where Ka and Kb represent output signals of the photodetectors 9 and 10 respectively.

Figure 7:
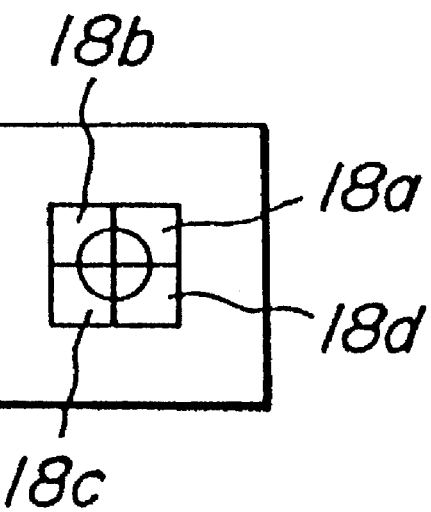
FIG. 7 is a plan view of the first photodetector of the second embodiment.
Figure 8:
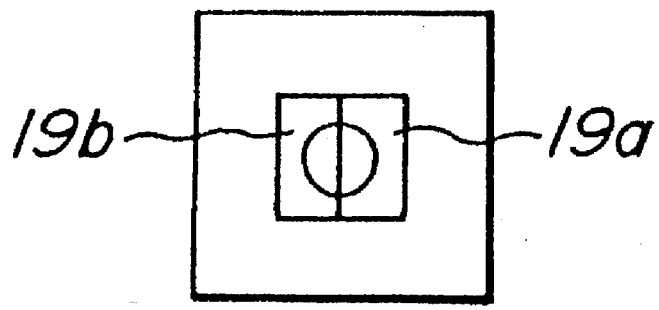
FIG. 8 is a plan view of the second photodetector of the second embodiment.

FIGS. 6 to 8 illustrate a second embodiment of the optical head according to the invention, where portions similar to those of the previous embodiment are denoted by the same reference numerals used in the first embodiment. A beam splitter 13 is provided on the optical path of the light beam emitted by the semiconductor laser 2, and a collimator lens 14 is provided on the optical path of the light beam transmitted through the beam splitter 13. A reflection mirror 15 is provided on the optical path of the light beam emanating from the collimator lens 14 for changing a propagating direction of the light beam upward in FIG. 6 and is made incident upon a recording surface of the opto-magnetic record medium (not shown) as a fine spot by means of an objective lens 16.

A light beam reflected by the opto-magnetic record medium (return light beam) is made incident on the light beam splitter 13 through the objective lens 16, mirror 15 and collimator lens 14 successively. The light beam reflected by the light beam splitter 13 is then made incident upon a half wavelength plate 17. The light beam emanating from the half wavelength plate 17 is then made incident upon an optical element 6. Light beams separated by the optical element 6 are made incident upon first and second photodetectors 18 and 19.

As illustrated in FIG. 7, the first photodetector 18 has four light receiving regions 18a to 18d which are divided into two orthogonal directions which are in parallel with and perpendicular to the information track on the opto-magnetic record medium. As shown in FIG. 8, the second photodetector 19 has two light receiving regions 19a and 19b which are divided by a line extending in parallel with the information track on the opto-magnetic record medium.

In the present embodiment, the optical element 6 has the curved beam splitting surface 8 formed on an incident-side surface of the optical element 6. The beam splitting surface 8 is coated with the multi-layered film of dielectric materials (not shown) to have such an optical property that a reflecting coefficient for the P-polarized light beam is approximately 0% and that for the S-polarized light is approximately 100% at a predetermined incident angle of $\alpha$. That is to say, the beam splitting surface 8 functions as an ideal polarizating beam splitter when the light beam is made incident thereupon at the incident angle $\alpha$.

In operation, the linearly polarized light beam emitted from the semiconductor laser 2 is made incident on the beam splitter 13, and the light beam transmitted through the beam splitter 13 is converted into parallel beams by the collimator lens 14, and thereafter the propagating direction of the parallel light beam is changed by 90 degrees by the mirror 15. Then, the light beam is made incident upon the recording surface of the opto-magnetic record medium as a very fine spot by means of the objective lens 16.

On the opto-magnetic record medium, the information is recorded as the magnetizing direction, and when the linearly polarized light beam is reflected by the opto-magnetic record medium, the polarizing direction is rotated in opposite directions by the Kerr effect depending on the magnetizing direction. The light beam reflected by the opto-magnetic record medium is made incident on the beam splitter 13 through the objective lens 16, reflection mirror 15 and collimator lens 14. The polarizing direction of this return light beam is rotated over 45 degrees by the half wavelength plate 17. Then, the return light beam is made incident upon the curved beam splitting surface 8 of the optical element 6. The beam splitting surface 8 is curved such that all light rays in the return light beam are made incident upon the surface substantially at the predetermined incident angle of $\alpha$. Therefore, the P-polarized component of the return light beam is transmitted through the beam splitting surface 8. In this case, the optical element 6 is arranged such that its optical axis is inclined with respect to the incident light beam, so that the astigmatism is introduced into the P-polarized component transmitted through the optical element 6. The P-polarized component having the astigmatism introduced therein is then made incident upon the first photodetector 18. Almost all the S-polarized component in the return light is reflected by the beam splitting surface 8 and is then made incident upon the second photodetector 19.

Also in the present embodiment, the information signal S can be obtained from the following equation:

$$S=(Ia+Ib+Ic+Id)-(Ja+Jb)$$

where Ia, Ib, Ic, Id represent output signals of the light receiving regions 18a, 18b, 18c, 18d of the first photodetector 18, and Ja, Jb represent output signals of the light receiving regions 19a, 19b of the second photodetector 19.

Further, the focusing error signal FE can be derived by the following equation by the astigmatism method:

$$FE=(Ia+Ic)-(Ib+Id)$$

The tracking error signal TE can be obtained from the following equation by the push-pull method:

$$TE=(Ja-Jb)$$

Figure 9:
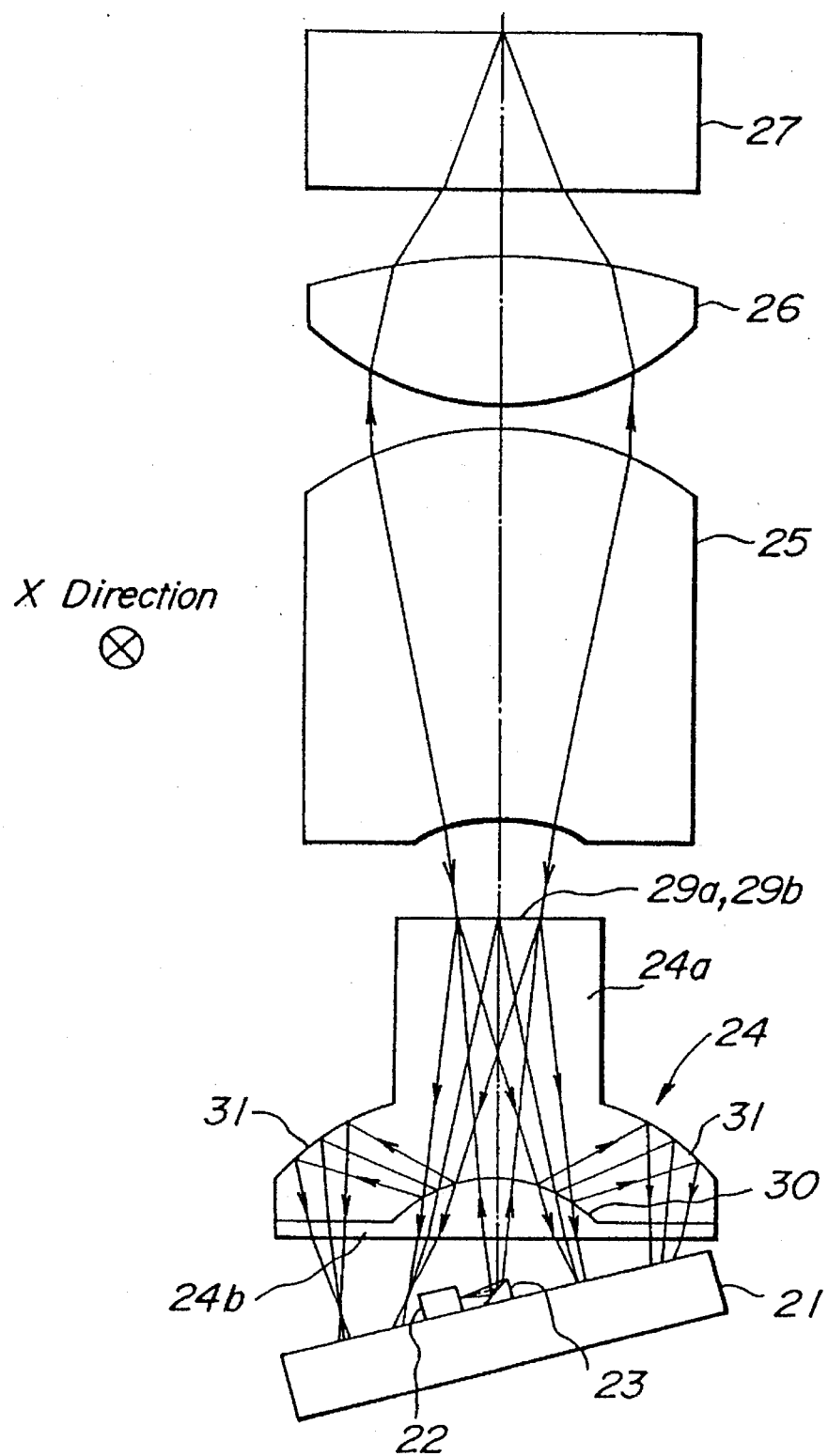
FIG. 9 is a sectional view depicting the construction of a third embodiment of the optical head according to the invention.
Figure 10:
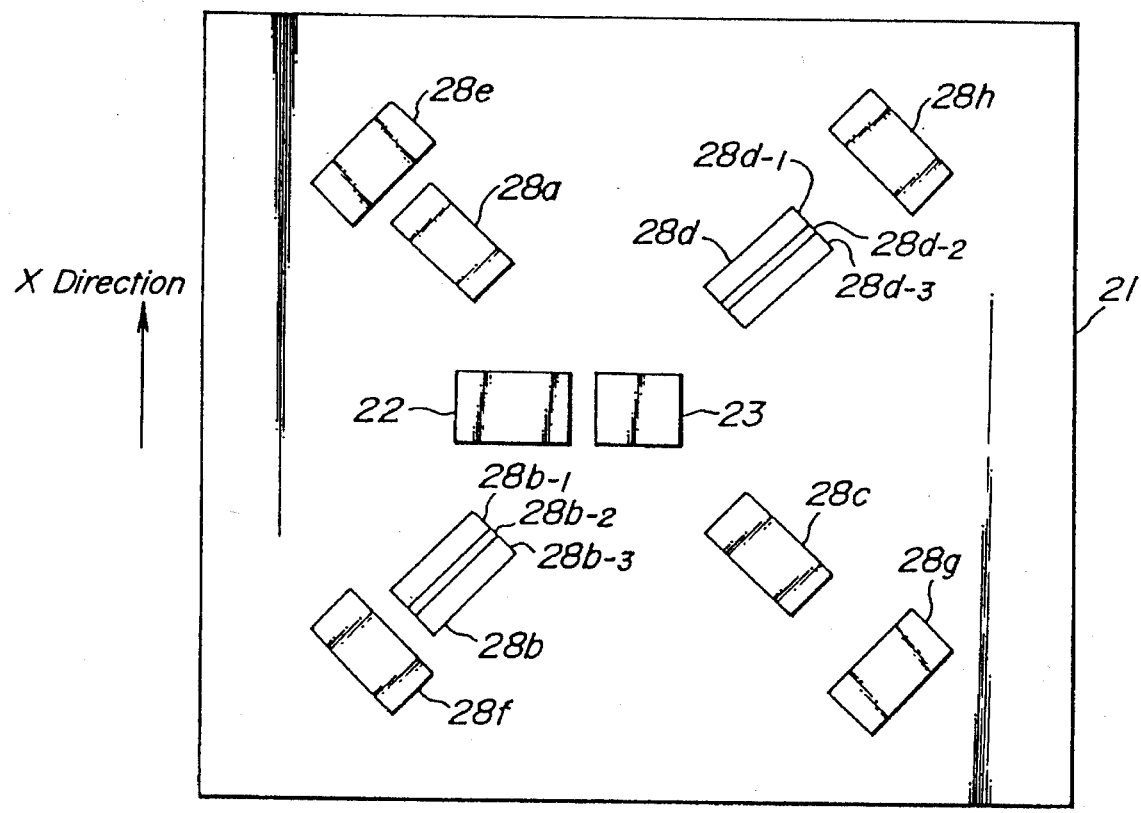
FIG. 10 is a plan view of the silicon substrate of the third embodiment.
Figure 11:
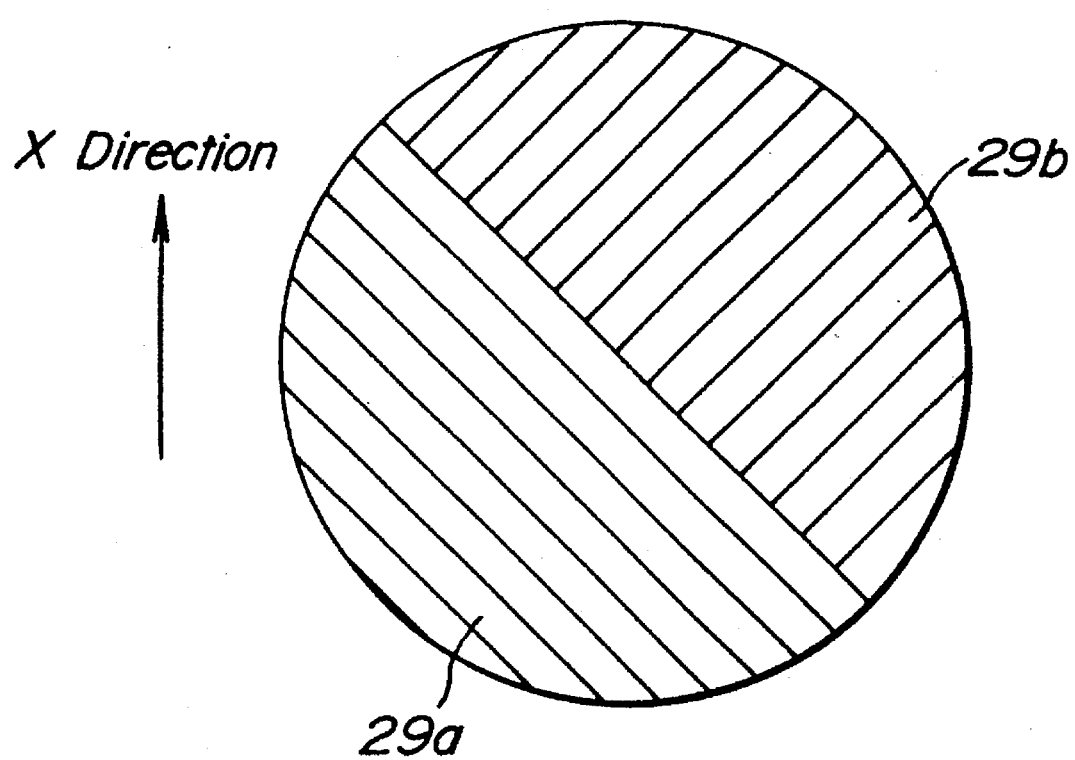
FIG. 11 is a schematic view showing the hologram of the third embodiment.

FIGS. 9, 10 and 11 show a third embodiment of the optical head according to the invention. In the present embodiment, semiconductor laser 22 and reflection mirror 23 are arranged on a silicon substrate 21. A linearly polarized light beam emitted from the semiconductor laser 22 is made incident upon an opto-magnetic record medium 27 via mirror 23, optical element 24, collimator lens 25 and objective lens 26, and the return light beam reflected by the opto-magnetic record medium 27 is made incident upon the silicon substrate 21 via the objective lens 26, collimator lens 25 and optical element 24. It should be noted that the laser light beam emitted by the semiconductor laser 22 is polarized on the X direction and the information track on the opto-magnetic record medium 27 extends in a direction which is inclined with respect to the X direction by 45 degrees.

FIG. 10 is a plan view of the silicon substrate 21. On the silicon substrate 21 there are provided, in addition to the semiconductor laser 2 and reflection mirror 23, eight photodetectors 28a, 28b, 28c, 28d, 28e, 28f, 28g and 28h. The photodetectors 28a, 28c, 28e and 28g are aligned on a line which is inclined from the X direction by 45 degrees, and photodetectors 28b, 28d, 28f and 28h are aligned on a line which is inclined from the X direction by −45 degrees. These photodetectors are arranged symmetrically with respect to the reflection mirror 23. Further, the photodetectors 28b and 28d aligned on the line of −45 degrees are divided into three light receiving regions 28b-1 to 28b-3 and 28d-1 to 28d-3, respectively.

The optical element 24 is formed by two plastic mold lenses 24a and 24b which are adhered to each other by means of an optical adhesive agent. The first and second plastic mold lenses 24a and 24b are formed in a rotation-symmetrical shape about the optical axis of the optical element 24. On a surface of the first plastic mold lens 24a facing the collimator lens 25, there is formed holograms 29a and 29b. As shown in FIG. 11, the holograms 29a and 29b are divided along a line which passes through the optical axis and extends in a direction which is inclined by −45 degrees with respect to the X direction. The hologram 29a has the grating construction which extends in a direction inclined by 45 degrees with respect to the X direction, and the grating contraction of the hologram 29b extends in a direction which is inclined with respect to the X direction by −45 degrees. Therefore, the gratings of these holograms 24a and 24b are orthogonal relative to each other. It should be noted that the distances of gratings of the holograms 24a and 24b are identical with each other.

In the present embodiment, a junction surface between these plastic mold lenses 24a and 24b is formed as a polarizing beam splitting surface 30. The beam splitting surface 30 is coated with a multi-layered film of dielectric materials such that the transmissivity for the light beam at an incident angle of zero degree is approximately 100%, the P-polarized light beam having an incident angle of approximately 39 degrees is fully transmitted through the surface 30 (reflecting coefficient is substantially 0%), but the S-polarized light beam having the same incident angle is not transmitted through the surface 30 (reflecting coefficient is substantially 100%).

On a side surface of the first plastic mold lens 24a facing the collimator lens 25, an aluminum coating is applied to form a totally reflecting surface 31 which reflects the S-polarized light beam reflected by the beam splitting surface 30.

Furthermore, in the present embodiment, the silicon substrate 21 is inclined by 14 degrees from a plane which is perpendicular to the optical axis of the optical element 24 and a prism forming the reflection mirror 23 has the apex angle of 38 degrees, so that the light beam reflected by the mirror 23 is coincident with the optical axis of the optical element 24. Further, since the silicon substrate 21 is inclined in the manner mentioned above, the +1 and −1 order diffracted light beams emanating from the hologram 29a are focused at points which situate before and behind the surface of the silicon substrate 21 when the light beam impinging upon the opto-magnetic record medium 27 is just focused on the recording layer, so that the focusing error signal can be obtained by the beam size method. However, the above mentioned inclination angle of the silicon substrate and apex angle of the prism are shown as only examples, and other angles may also be used, and in such cases, various angles described below may be changed depending on the said angles employed.

In the present embodiment, the information track on the opto-magnetic record medium 27 extends in a direction which is tilted by 45 degrees from the X direction, where the X direction represents the linearly polarized direction of laser light beam emitted by the semiconductor laser 2.

Now the operation of the optical head of the present embodiment will be explained. The laser light beam linearly polarized in the X direction is emitted from the semiconductor laser 22, 22 and is made incident upon the beam splitting surface 30 of the optical element 24 at an incident angle substantially equal to zero degree. Therefore, the light beam is almost transmitted through the beam splitting surface 30 and is made incident upon the holograms 29a and 29b. The zero order beam emanating from the holograms 29a, 29b is then converted into the parallel light beam by means of the collimator lens 25. This parallel light beam is converged by the objective lens 26 and is projected onto the opto-magnetic record medium 27 as the fine spot.

When the light beam linearly polarized in the X direction is reflected by the opto-magnetic record medium 27, the polarizing direction is rotated from the X direction by the Kerr rotation angle in a direction depending upon the direction of the magnetization in the record layer of the opto-magnetic record medium 27. The light beam reflected by the opto-magnetic record medium 27 is then made incident upon the holograms 29a, 29b by means of the objective lens 26 and collimator lens 25.

The +1 order beam emanating from the hologram 29a is diffracted in a direction inclined by 135 degrees with respect to the X direction, the −1 order beam emanating from the hologram 29a is diffracted into a direction inclined by −45 degrees with respect to the X direction, and these first order diffracted light beams are made incident upon the beam splitting surface 30 substantially at the same incident angle. Almost all the P-polarized component of the +1 order diffraction beam is transmitted through the beam splitting surface 30 and is made incident upon the photodetector 28b, and almost all the S-polarized component of the +1 order diffraction beam is reflected by the beam splitting surface 30 and is further reflected by the total reflection mirror surface 31 and is finally made incident upon the photodetector 28f. Similarly, almost all the P-polarized component of the −1 order diffraction beam is transmitted through the beam splitting surface 30 and is made incident upon the photodetector 28d, and almost all the S-polarized component of the −1 order diffraction beam is reflected by the beam splitting surface 30 and total reflection mirror surface 31 and is then made incident upon the photodetector 28h.

The +1 order beam of the return beam impinging upon the hologram 29b is diffracted into a direction inclined by 45 degrees from the X direction, and the −1 order beam is diffracted into a direction inclined by − 135 degrees with respect to the X direction. These +1 and −1 order diffraction beams emanating from the hologram 29b are then made incident upon the beam splitting surface 30. Almost all the P-polarized component of the +1 order diffraction beam is transmitted through the beam splitting surface 30 and is made incident upon the photodetector 28a, and almost all the S-polarized component of the +1 order diffraction beam is reflected by the beam splitting surface 30 and is further reflected by the total reflection mirror surface 31 and is finally made incident upon the photodetector 28e. Similarly, almost all the P-polarized component of the −1 order diffraction beam is transmitted through the beam splitting surface 30 and is made incident upon the photodetector 28c, and almost all the S-polarized component of the −1 order diffraction beam is reflected by the beam splitting surface 30 and total reflection mirror surface 31 and is then made incident upon the photodetector 28g.

As explained above, the silicon substrate 21 is inclined with respect to the plane perpendicular to the optical axis of the optical element 24 by 14 degrees, so that in the in-focused condition, the +1 diffraction beam emanating from the hologram 29a is focused at a point before the photodetector 28b and the −1 order diffraction beam emanating from the hologram 29a is focused at a point behind the photodetector 28d such that the light beam spots formed on these photodetectors 28b and 28d have the same size. The sizes of these spots on the photodetectors 28b and 28d are varied in opposite directions in accordance with the defocusing.

Therefore, in the present embodiment, the focusing error signal FE can be obtained by the beam size method in accordance with the following equation:

$$FE=(Ib1-Ib2+Ib3)-(Id1-Id2+Id3)$$

Where I b1, Ib2, Ib3 and Id1, Id2, Id3 represent output signals generated by the light receiving elements 28b-1, 28b-2, 28b-3 and 28d-1, 28d-2, 28d-3 of the photodetectors 28b and 28d, respectively.

The holograms 29a and 29b are divided by the line parallel with the information track of the opto-magnetic record medium 27, and thus the tracking error signal can be obtained by the push-pull method by deriving a difference between an amount of light transmitted through the hologram 28a and an amount of light transmitted through the hologram 29b. That is to say, the tracking error signal TE can be obtained by the following equation:

$$TE=(Ib1+Ib2+Ib3+Id1+Id2+Id3+If+Ih) -(Ia+Ic+Ie+Ig)$$

where Ia, Ic, Ie, If, Ig and Ih denote the output signals of the photodetectors 28a, 28c, 28e, 28f, 28g and 28h.

The polarizing direction of the return beam reflected by the opto-magnetic record medium 27 is rotated by the Kerr rotation angle from the X direction, and the variation of the polarizing direction results in the variation of a ratio of the P-polarization component to the S-polarization component emanating from from the beam splitting surface 30. Therefore, the information signal RF can be obtained by the following equation, $$RF=(Ib1+Ib2+Ib3+Id1+Id2+Id3+Ie+Ig) -(Ia+Ic+If+Ih)$$

Advantages of the third embodiment may be listed as follows in comparison with the first embodiment.

(1) The use of collimator lens 25 can provide a separated optical system in which the objective lens 26 is movable and the remaining members are fixed.

(2) Since the holograms 29a and 29b are formed as the equidistant linear lattice, the +1 and −1 order beams are diffracted in the opposite directions. Consequently, upon determining the surface configuration of the beam splitting surface 30, it is not necessary to consider a difference in the diffraction angle between the +1 and −1 order diffraction beams. This results in that both the diffraction beams can be made incident upon the beam splitting surface 30 precisely at the incident angle of 39 degrees. Therefore, the quality of the information signal can be improved.

(3) The optical element 24 is formed by adhering the first plastic mold lens 24a and the second plastic mold lens 24b, and hence the P-polarized components of the light beam transmitted through the beam splitting surface 30 is not refracted by the beam splitting surface. This results in that only a small aberration is introduced into the P-polarized component of the light beam transmitted through the optical element 24 and thus the quality of the focusing error signal.

(4) The S-polarized component reflected by the beam splitting surface 30 is again reflected by the total reflecting mirror surface 31, and thus all the photodetectors can be formed on the single silicon substrate 21.

(5) Since the mirror surface 31 has a curved shape, the diverging light beam reflected by the beam splitting surface 28 is converged by the mirror surface. Therefore, the photodetectors 28e, 28f, 28g and 28h receiving the thus converged light beams can be smaller.

The present invention is not limited to the embodiments explained above, but many alternations and modifications may be conceived by those skilled in the art within the scope of the invention. For instance, in the above embodiments, the beam splitting surface is arranged within the converging light beam, but according to the invention, it is also possible to provide the beam splitting surface within the diverging light beam. Further the half wavelength plate provided in the second embodiment shown in FIG. 6 may be arranged in the other embodiments. Moreover, in the third embodiment illustrated in FIGS. 9 to 11, the hologram is formed by the two hologram halves which are divided in the direction of the information track on the record medium, the diffraction gratings of the first and second hologram halves are extended in the mutually orthogonal first and second directions, and the first direction is in parallel with said division direction. According to the invention, it is not always necessary to set the first and second directions of the diffraction gratings to be perpendicular to each other and to set the first direction in parallel with the division direction.

As fully described hereinbefore, according to the invention, the beam splitting surface is curved such that almost all light rays of the return light beam reflected by the opto-magnetic record medium are made incident upon the beam splitting surface substantially at the same incident angle although the beam splitting surface is arranged within the converging or diverging light beam, and therefore it is possible to effect the beam splitting function accurately and to obtain the information signal, focusing error signal and tracking error signal in a precise manner.

What is claimed is:

1. An optical head for recording and reproducing information by irradiating a fine light spot on an optical record medium, comprising:

a light source for emitting a linearly polarized light beam;

an optical lens system including an objective lens for projecting said light beam onto the optical record medium as the light spot and for collecting light reflected by the optical record medium to form a return light beam;

a beam splitting means having a beam splitting surface for splitting said return light beam into a plurality of light beams, said beam splitting surface being curved such that light rays in the return light beam are made incident upon said beam splitting surface substantially at a same incident angle; and a photoelectric converting means having a plurality of photodetectors for receiving said plurality of light beams split by said beam splitting surface, wherein said beam splitting surface is arranged in a converging portion of said return light beam.

* * * * *